US005107283A

United States Patent [19]

Ueno et al.

[11] Patent Number: 5,107,283

[45] Date of Patent: Apr. 21, 1992

[54] ELECTROSTATIC RECORDING HEAD WITH IMPROVED ALIGNMENT OF RECORDING ELECTRODES

[75] Inventors: Noboru Ueno, Nagano; Yuki Nakamura, Ina, both of Japan

[73] Assignee: Nippon Steel Corporation, Tokyo, Japan

[21] Appl. No.: 634,608

[22] Filed: Dec. 27, 1990

[30] Foreign Application Priority Data

Dec. 27, 1989 [JP] Japan .................................. 1-338962
Dec. 27, 1989 [JP] Japan .................................. 1-338963

[51] Int. Cl.[5] .............................................. G01D 15/06
[52] U.S. Cl. .................................. 346/155; 346/139 C
[58] Field of Search .................. 346/155, 160.1, 139 C

[56] References Cited

U.S. PATENT DOCUMENTS 4,131,986 1/1979 Escriva et al. .................. 346/139 C
4,356,501 10/1982 Ronen ................................ 346/155
4,638,339 1/1987 Coburn et al. .................... 346/153.1
4,679,054 7/1987 Yoshikawa et al. ............ 346/155 X

FOREIGN PATENT DOCUMENTS 0223280 6/1985 Fed. Rep. of Germany ...... 346/155
53-20929 2/1978 Japan .
56-110959 9/1981 Japan .
56-122056 9/1981 Japan .
0198245 10/1985 Japan .................................. 346/155
0004964 1/1988 Japan .................................. 346/155

*Primary Examiner*—Benjamin R. Fuller
*Assistant Examiner*—Randy W. Gibson
*Attorney, Agent, or Firm*—Pollock, Vande Sande & Priddy

[57] ABSTRACT

The present invention is directed to an electrostatic recording head comprising an electrode substrate made of an insulating material, a plurality of parallel recording electrodes made of a conductive material and formed on at least one of the side surfaces of the electrode substrate so that tip portions of the recording electrodes are in alignment, a rigid outer member made of an insulating material for covering both side surfaces of the electrode substrate to fix the electrode substrate, and an insulating resin layer filled into a space formed at least at a part of the tip portions of the recording electrodes between each of the side surfaces of the electrode substrate and the outer member, the insulating resin layer also filling gaps between every adjacent two of the recording electrodes, whereby substantially preventing electromigration.

12 Claims, 9 Drawing Sheets

ELECTROSTATIC RECORDING HEAD WITH IMPROVED ALIGNMENT OF RECORDING ELECTRODES

BACKGROUND OF THE INVENTION

1. Field of the Invention

The present invention relates to an electrostatic recording head used in an electrostatic recording apparatus, and to a method of manufacturing such electrostatic recording head.

2. Description of the Related Art

An electrostatic recording head of the multiple electrode type is used in an electrostatic recording apparatus in which an electrostatic latent image is formed at a high speed on a recording medium having a charge holding surface and a conductive layer, by applying image signals from a computer, electrographic or the like, through the electrostatic recording head to the recording medium, and a toner is used to develop the electrostatic latent image into a visible image. Such an electrostatic recording head is known from, for example, JP-A-53-20929, JP-A-56-110959, JP-A-56-122056, and co-pending U.S. application Ser. No. 556,728 filed on July 25, 1990 and entitled "Electrostatic Recording Head and Method of Making the Same".

FIG. 13 is a perspective view showing one of conventional electrostatic recording heads, FIG. 14 is an enlarged view showing a tip portion of the recording head of FIG. 13, and FIG. 15 is a diagram showing a part of the fabrication process of the recording head. The electrostatic recording head is provided with a substrate 100 and a plurality of recording electrodes 101 formed on the substrate 100. The recording electrodes 101 are formed by etching a thin film on the substrate in accordance with a predetermined pattern, and the thin film is deposited on the surface of the substrate 100, for example, by electroless plating. In this case, in order to improve the resolution of a recorded image, the recording electrodes 101 are formed so that the gap between adjacent electrodes on one surface of the substrate and an electrode on the other surface of the substrate face each other.

As shown in FIG. 15, the substrate 100 provided with the recording electrodes 101 is inserted into a mold 105, and thermosetting epoxy resin 102 is introduced into the mold 105 so that the substrate 100 is surrounded with the epoxy resin. After having been hardened, the epoxy resin 102 is taken out of the mold 105, and the tip of the epoxy resin is polished together with the substrate buried therein to obtain the electrostatic recording head shown in FIG. 13. As mentioned above, the substrate 100 is covered with the epoxy resin 102. Thus, the substrate 100, specifically, the tip portion of the substrate 100 which is put in slidable contact with recording paper, is protected by the epoxy resin 102.

In the conventional electrostatic recording head, however, the epoxy resin is put in direct contact with the substrate, and thus there arises a problem that the electric corrosion resistance is low.

In particular, the epoxy resin 102 shanks through hardening processing. Accordingly, the epoxy resin 102 which has been hardened, may separate from the substrate 100, and a gap may be produced between the epoxy resin 102 and the substrate 100. Further, when a high voltage is applied to the recording electrodes 101 for a long time, the epoxy resin existing between adjacent recording electrodes is degraded, so that an offset may occur between the surface of the epoxy resin 102 and the top edge of the substrate 100. When such an offset is generated, the recording electrodes may be deformed due to mechanical slippage between the recording head and the recording sheet during recording operation, resulting in short circuit between adjacent recording electrodes 101. Further, the air moisture may permeate into the head through the offset. When a high voltage is applied to the recording electrodes 101 for a long time in such a state, a phenomenon called "electrochemical migration" occurs. That is, copper ions from the recording electrodes 101 made of copper permeate into the epoxy resin existing between adjacent recording electrodes, which may result in a short circuit between adjacent recording electrodes. Further, since the tips of the electrodes are no more protected by the epoxy resin, the degradation of the electrodes is accelerated so that it may be difficult to ensure excellent quality of recorded image.

The mold resin 102 shrinks and deforms from the semi-fluid state when the resin 102 is introduced into the mold 105 to a solid state after hardening processing. When such shrinkage is generated, a large stress is applied to the substrate having the recording electrodes, and the substrate may be bent. Further, even if the straightness of the substrate 100 is only slightly deteriorated by the above bend, the picture quality of a recorded image will be degraded. Specifically, in a case where the width H of the electrostatic recording head is as large as 90 cm, the substrate is readily bent by the shrinkage of the mold resin 102.

Further, such shrinkage of the mold resin 102 damages the recording electrodes 101, and deviates the distance between adjacent recording electrodes from a predetermined value. Such defects are found after the mold resin 102 has been filled to cover the substrate 100 and hardened. Accordingly, it is required to discard the whole of the electrostatic recording head as a defective. Thus, the manufacturing yield is low, and the manufacturing cost is increased.

Further, another conventional electrostatic recording head is known in which, as shown in FIG. 16, wire electrodes 103 having a predetermined positional relation are used in place of the thin-film electrodes. In a case where this recording head is fabricated, also, the above-mentioned problems will arise.

SUMMARY OF THE INVENTION

It is an object of the present invention to provide an electrostatic recording head, in order to solve the above-mentioned problems of the conventional electrostatic recording heads, having less offset between the surface of the electrode substrate and that of the mold resin thereby exhibiting satisfactory electric-corrosion resistance, and to provide a method of fabricating the above electrostatic recording head.

It is another object of the present invention to provide an electrostatic recording head in which bending of the electrode substrate due to the shrinkage of the mold resin and also formation of a gap between the mold resin and the electrode substrate due to stress produced by hardening process of the resin have been substantially eliminated, and to provide a method of fabricating the above electrostatic recording head.

In order to attain the above objects, an electrostatic recording head according to a first embodiment of the present invention comprises an electrode substrate made of an insulating material, a plurality of parallel recording electrodes made of a conductive material and formed on at least one side surface of the electrode substrate so that the tip portions of the recording electrodes are in alignment, a rigid outer member made of an insulating material for covering both side surfaces of the electrode substrate to fix the electrode substrate, and an insulating resin layer for filling up a gap which is formed between each side surface of the electrode substrate and the outer member, and includes at least a part of the tip portions of the recording electrodes.

Further, an electrostatic recording head according to a second embodiment of the present invention comprises an electrode substrate made of an insulating material, a plurality of parallel recording electrodes made of a conductive material and formed on at least one side surface of the electrode substrate so that the tip portions of the recording electrodes are in alignment, an outer member made of a rigid resin for covering both side surfaces of the electrode substrate, and a layer containing a plurality of small rigid particles which fill up a space existing between each side surface of the electrode substrate and the outer member and containing at least the tip portions of the recording electrodes, the small rigid particles being made of an insulating inorganic material.

According to one preferred embodiment of the present invention, there is provided a method of fabricating an electrostatic recording head which comprises the steps of: bonding a pair of rigid outer members to both side faces of an electrode substrate, the rigid outer members being made of an insulating material, a plurality of parallel recording electrodes being formed on at least one side surface of the electrode substrate so that the tip portions of the recording electrodes are in alignment, the recording electrodes being made of a conductive material, a gap being formed in a part of the interface between each outer member and a corresponding side surface of the electrode substrate, the gap containing at least a part of that area of the side surface where the tip portions of the recording electrodes exist; and introducing a mold resin into the gap and hardening the mold resin.

According to another embodiment of the present invention, there is provided a method of fabricating an electrostatic recording head which comprises the steps of: coating both side surfaces of an electrode substrate having a plurality of parallel recording electrodes, with a layer containing a plurality of small rigid particles so that at least the recording electrodes are buried in the layer, the recording electrodes being formed on at least one side surface of the electrode substrate so that the tip portions of the recording electrodes are in alignment, the recording electrodes being made of a conductive material, the small rigid particles being made of an insulating material; and forming a mold resin layer so that both sides of the electrode substrate coated with the rigid-particle containing layer are covered with the mold resin layer.

According to a further embodiment of the present invention, there is provided a method of fabricating an electrostatic recording head which comprises the steps of: fixing an electrode substrate having a plurality of parallel recording electrodes, in a mold so that the tip portions of the recording electrodes are disposed in a bottom portion of the mold and a space is formed between each of side surfaces of the electrode substrate and the side wall of the mold, the recording electrodes being formed on at least one side surface of the electrode substrate so that the tip portions of the recording electrodes are in alignment, the recording electrodes being made of a conductive material; introducing a nonharden resin into the space; and introducing a plurality of small rigid particles made of an insulating material into the non-harden resin so as to cause the particles, to settle at the bottom thereby enclosing the tip portions of the recording electrodes before the mold resin is hardened.

BRIEF DESCRIPTION OF THE DRAWINGS

FIGS. 5A to 5C and 5'A to 5'D are diagrams for explaining the steps of a method of fabricating a fifth embodiment of an electrostatic recording head according to the present invention and that of a modification thereof, respectively.

DESCRIPTION OF THE PREFERRED EMBODIMENTS

A first embodiment of an electrostatic recording head according to the present invention will be explained with reference to FIGS. 1A to 1C.

Figure 1A:
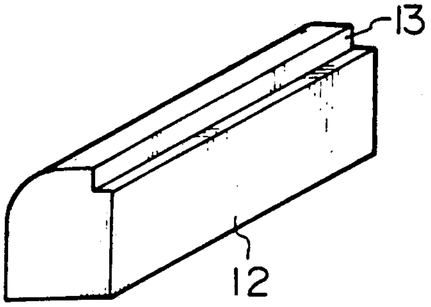
FIGS. 1A, 1B and 1C are diagrams explaining some steps of a method of fabricating a first embodiment of an electrostatic recording head according to the present invention.
Figure 1B:
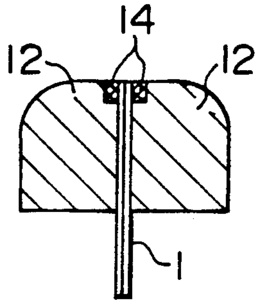
Figure 1C:
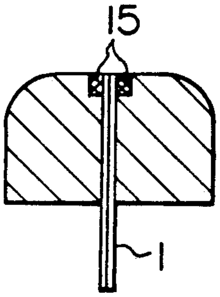

FIG. 1A is a perspective view showing an outer frame member used in the first embodiment, FIG. 1B is a sectional view showing a structure which is obtained by bonding a pair of outer frame members to an electrode portion, and FIG. 1C is a sectional view of the above structure at a time a mold resin has been introduced into each gap of the structure and has been hardened.

Figure 14:
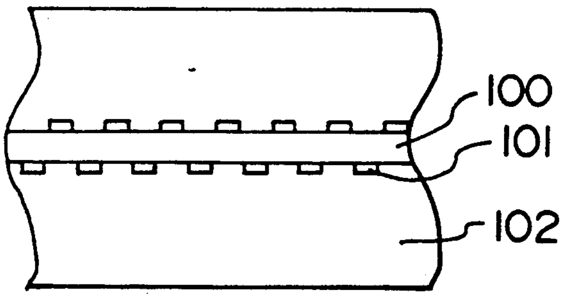
FIG. 14 PRIOR ART
Figure 15:
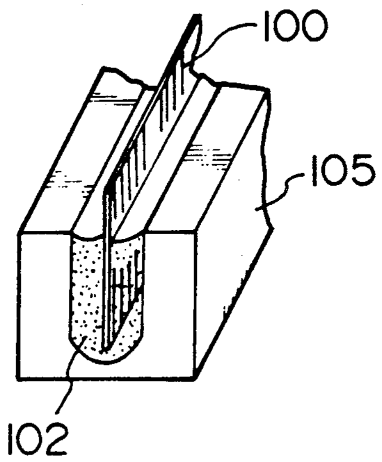
FIG. 15 PRIOR ART
Figure 16:
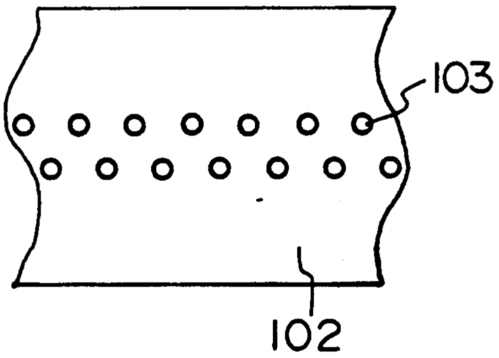
FIG. 16 PRIOR ART
FIG. 16 is a diagram showing a tip portion of another conventional electrostatic recording head.

An electrode portion 1 shown in FIG. 1B is substantially the same as the electrode portion shown in FIG. 14. In order to make the electrode portion, a thin metal film made of copper or the like is deposited on one surface of an electrode substrate by the wet plating method or sputtering method, or a thin copper film is bonded directly to one surface of the electrode substrate. The electrode substrate is formed of one of various glass-resin complex plates such as a glass-epoxy complex plate, a glass-polyimide complex plate, and a glass-polyester complex plate. Alternatively, the electrode substrate may be formed of a resin plate which is made of polyimide, epoxy, or polyester. Further, the electrode substrate may be made of one of inorganic materials such as ceramics, alumina and glass, or a composite material such as epoxy resin having a fiber cloth therein. The thin copper film is etched so that a useless portion other than electrodes is removed, to form recording electrodes in accordance with a predetermined pattern. The other surface of the electrode substrate is polished to a flat surface finish. In order to improve a recording density, the rear surfaces of a pair of electrode substrates, each provided with the above-mentioned recording electrodes, are bonded to each other so that a recording electrode on one of the electrode substrates and a gap between adjacent recording electrodes on the other electrode substrate face each other, that is, that is, the recording electrodes on the electrode substrates are in a zigzag-like arrangement.

The electrode portion 1 thus obtained is bonded to a pair of outer frame members 12, as shown in FIG. 1B. That is, the electrode portion 1 is fixedly sandwiched between the outer frame members 12. As shown in FIG. 1A, a longitudinal groove 13 is provided in a recording/sliding portion of each outer frame member 12. Accordingly, when the electrode portion 1 is sandwiched between the outer frame members 12, a gap 14 is formed between each outer frame member 12 and the electrode portion 1. Various kinds of materials can be used for making the outer frame member 12, provided that the materials are electrically insulating and has satisfactory rigidity. For example, a thermoplastic resin such as polyester resin, a thermosetting resin, glass, or ceramics can be used for making the outer frame member 12. That surface of the outer frame member 12 which is pressed against the electrode portion, has a direct influence on the straightness of the electrode portion 1. Accordingly, it is necessary to polish the above surface so that a sufficiently flat surface is obtained.

After the electrode portion 1 has been fixedly sandwiched between the outer frame members 12 by means of a jig (not shown), a mold resin 15 for embedding the recording electrodes is introduced into the gap 14 and is then hardened, as shown in FIG. 1C. According to the conventional method of fabricating an electrostatic recording head, a large amount of mold resin is used. In order to reduce a stress which is generated when the mold resin is hardened, epoxy resin containing large filler particles at 50 to 90% by weight is used as the mold resin. In this case, however, the diameter of the filler particle is too large to fill the gap between adjacent recording electrodes sufficiently with the particle containing epoxy resin. Accordingly, the electric-corrosion resistance of the recording head is deteriorated, and the damage to the recording electrodes is caused by the degradation of the resin. Thus, the picture quality of an image is degraded by the drop out in drawing the image. On the other hand, according to the present embodiment, a very small amount of mold resin 15 is used, and thus the shrinkage of the mold resin is substantially small. Various kinds of resins can be used which are excellent in electric-corrosion resistance. Accordingly, in the present embodiment, in order to protect the recording electrodes applied with a high voltage, it is possible to use, as the mold resin 15, a resin which is not only excellent in electric-corrosion resistance (that is, breakdown voltage, tracking resisting property and arc resisting property), but also has an excellent heat resisting property, an excellent wear resisting property and a small-thermal expansion coefficient. As an example, epoxy resin is particularly suited to be used as the mold resin 15. A hardner for the epoxy resin is selected from amine, anhydrous acid, imidazole, and others. Further, in addition to epoxy resin, a thermosetting resin such as polyimide can be used as the mold resin 15.

Further, unlike a method of fabricating the conventional electrostatic recording head, the present embodiment uses a very small amount of mold resin (that is, epoxy resin). Accordingly, the shrinkage of the mold resin due to the hardening thereof can be small. Thus, undesired stress applied to the electrode portion 1 can be made very small, and the electrode portion is prevented from warping. Further, the generation of a crack in the hardened resin 15 and the separation of the resin 15 from the electrode portion 1 can be prevented. As a result, variations in distance between adjacent recording electrodes due to the above-mentioned phenomena can be reduced.

According to the present embodiment, the electric-corrosion resistance is improved, and moreover the generation rate of defectives can be reduced. Thus, the manufacturing yield is increased, and the manufacturing cost is reduced.

According to the present embodiment, after the electrode portion 1 has been fixedly sandwiched between the outer frame members 12, the mold resin 15 is introduced into the gap 14 and then hardened. Accordingly, the present embodiment is superior in straightness of the electrode portion 1 to the conventional electrostatic recording head.

Figure 2A:
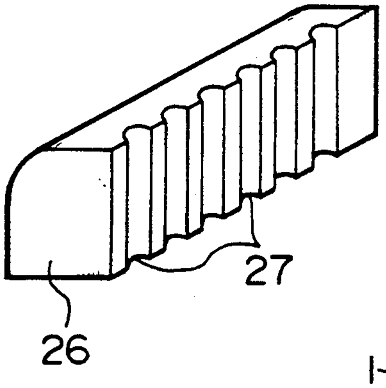
FIGS. 2A, 2B and 2C are diagrams explaining some steps of a method of fabricating a second embodiment of an electrostatic recording head according to the present invention.
Figure 2B:
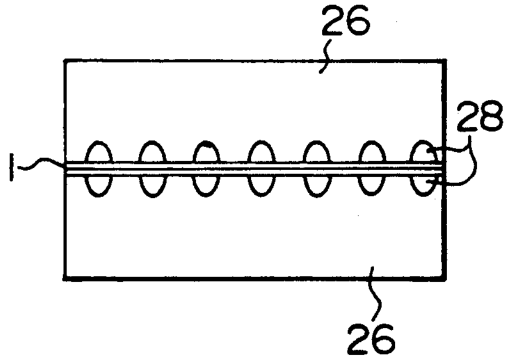
Figure 2C:
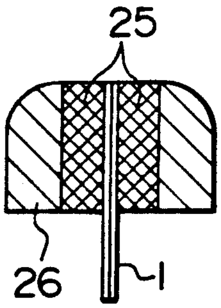

FIG. 2A is a perspective view showing an outer frame member 26 which is included in a second embodiment of an electrostatic recording head according to the present invention, FIG. 2B is a plan view of a structure which is obtained by sandwiching an electrode portion 1 fixedly between a pair of outer frame members 26, and FIG. 2C is a sectional view of the above structure at a time a mold resin has been introduced into each gap of the structure and has been hardened.

Referring to FIG. 2A, a plurality of grooves 27, each having the form of a semicircular cylinder, are provided in the outer frame member 26 in transverse directions. Like the groove 13 of FIG. 1A, the groove 27 forms a gap 28 into which a mold resin 25 is to be introduced, between the outer frame member 26 and the electrode portion 1, when the outer frame member 26 is bonded to the electrode portion 1. The present embodiment is obtained in such a manner that the mold resin 25 is introduced into the gap 28 of the structure obtained by sandwiching the electrode portion 1 fixedly between a pair of outer frame members 26, and is then hardened. That is, a very small amount of mold resin is used. Accordingly, like the first embodiment, the present embodiment is insignificantly affected by the shrinkage of the mold resin 25 due to the hardening thereof.

Figure 3A:
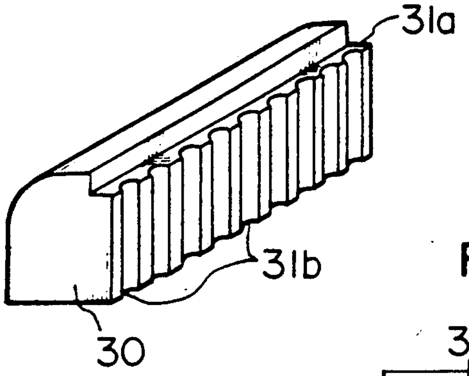
FIGS. 3A, 3B and 3C are diagrams explaining some steps of a method of fabricating a third embodiment of an electrostatic recording head according to the present invention.
Figure 3B:
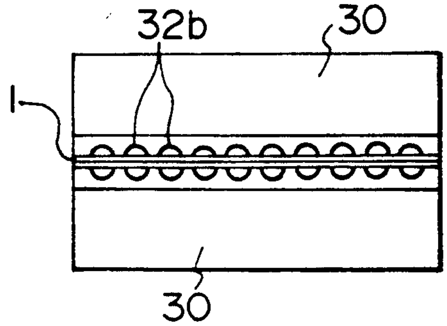
Figure 3C:
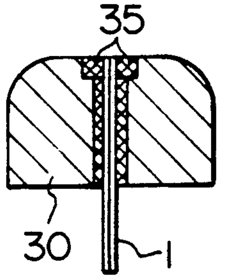

FIG. 3A is a perspective view showing an outer frame member 30 which is included in a third embodiment of an electrostatic recording head according to the present invention, FIG. 3B is a plan view of a structure which is obtained by sandwiching an electrode portion fixedly between a pair of outer frame members 30, and FIG. 3C is a sectional view of the above structure with a mold resin introduced into the gaps thereof and hardened.

Referring to FIG. 3A, a groove 31*a* is provided in a tip portion of the outer frame member 30 in a longitudinal direction, and a plurality of grooves 31*b* each having the form of a semicircular cylinder are provided in that portion of the outer frame member 30 which exists under the groove 31*a*, in transverse directions. That is, gaps 32*a* and 32*b* shown in FIG. 3B correspond to the gap 14 of FIG. 1B and the gap 28 of FIG. 2B, respectively.

In the outer frame member 12 of FIG. 1A, those tip portions of the recording electrodes which are in slidable contact with recording paper when used for recording, are all protected by the resin 15, but the resin 15 cannot be introduced into a lower portion of the outer frame member 12. On the other hand, in the outer frame member 26 of FIG. 2A, the mold resin 25 can be introduced into a greater part of the interface between the outer frame member 26 and the electrode portion, but it is impossible to sufficiently protect the tip portions of the recording electrodes which are readily damaged. According to the third embodiment, the outer frame member 30 has the form shown in FIG. 3A, and can eliminate both the drawbacks of the outer frame members 12 and 26 shown in FIGS. 1A and 2A, respectively. In the third embodiment, also, the amount of the mold resin 35 used is sufficiently small. Accordingly, the third embodiment is insignificantly affected by the shrinkage of the mold resin 35 due to the hardening thereof.

Figure 4A:
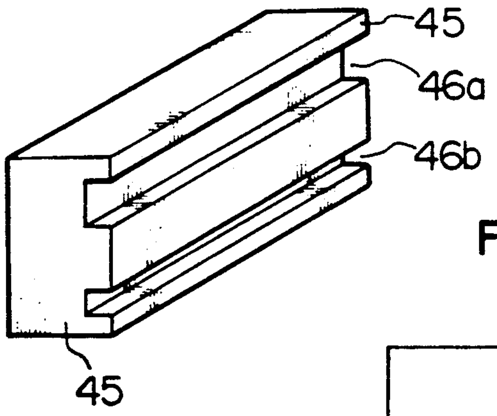
FIGS. 4A, 4B and 4C are diagrams for explaining some steps of a method of fabricating a fourth embodiment of an electrostatic recording head according to the present invention.
Figure 4B:
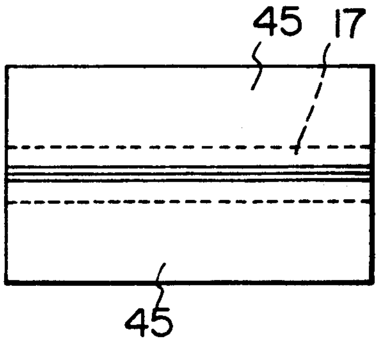
Figure 4C:
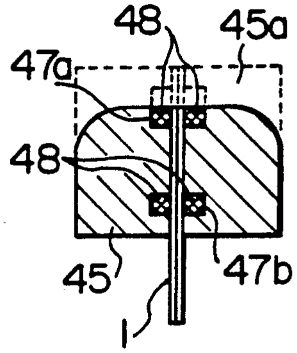

FIG. 4A is a perspective view showing an outer frame member 45 which is used for making a fourth embodiment of an electrostatic recording head according to the present invention, FIG. 4B is a plan view of a structure which is obtained by sandwiching an electrode portion 1 fixedly between a pair of outer frame members 45, and FIG. 4C is a sectional view of the above structure with mold resin introduced into the gaps thereof and hardened.

Referring to FIG. 4A, two parallel grooves 46*a* and 46*b* are provided in the outer frame member 45 in longitudinal directions. The groove 46*a* is provided in that portion of the outer frame member 45 which is spaced apart slightly from the tip of the member 45. When the electrode portion 1 is fixedly sandwiched between a pair of outer frame members 45, gaps 47*a* and 47*b* are formed between the electrode portion 1 and each outer frame member 45. A mold resin 48 is introduced into the gaps 47*a* and 47*b* and is then hardened, to obtain a basic structure. That tip portion 45*a* of the basic structure which is indicated by a broken line in FIG. 4C, is removed, and the tip of the remaining portion of the basic structure is polished. Thus, the electrode portion 1 and the resin 48 in the gap 47*a* are exposed to the top surface of the recording head. The straightness of the electrode portion 1 can be securely maintained at the top portion of the electrostatic recording head which is in slidable contact with recording paper when used for recording.

Further, as can be seen from FIG. 4C, not only the recording electrodes at the tip portion of the recording head are protected by the resin 48 in the gap 47*a*, but also the electrode portion 1 can be securely bonded to the outer frame members 45 by the resin 48 in the gap 47*b*. Other advantages of the fourth embodiment are the same as those of the first embodiment.

Figure 5A:
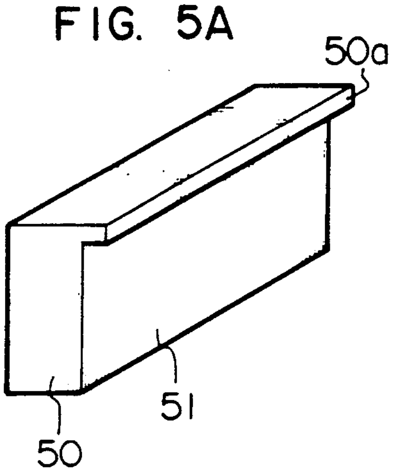
Figure 5B:
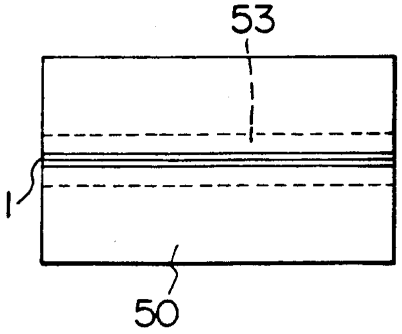
Figure 5C:
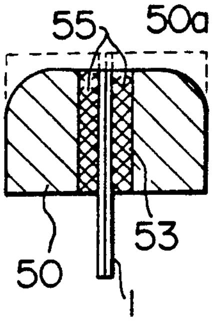
Figure 5C:
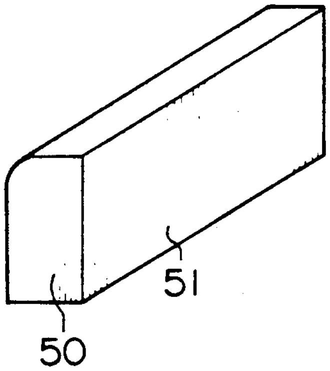
Figure 5C:
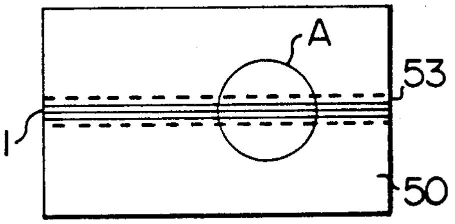
Figure 5C:
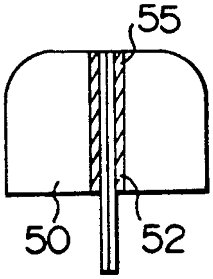
Figure 5C:
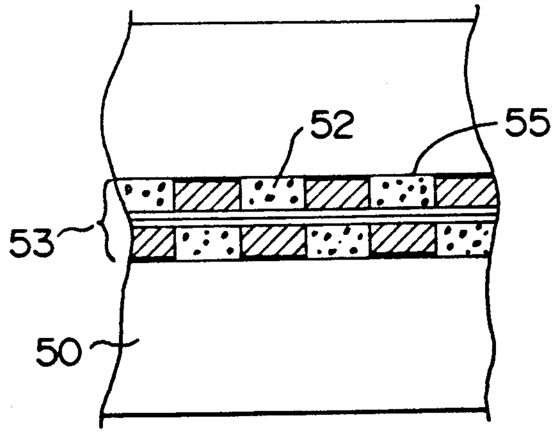

FIG. 5A is a perspective view showing an outer frame member 50 which is used for making a fifth embodiment of an electrostatic recording head according to the present invention, FIG. 5B is a plan view of a structure which is obtained by holding an electrode portion 1 fixedly between a pair of outer frame members 50, and FIG. 5C is a sectional view of the above structure with mold resin introduced into the gaps thereof and hardened.

As shown in FIG. 5A, a cut portion 51 is provided in the outer frame member 50 of the present embodiment. The electrode portion 1 is sandwiched between the protruding portions 50*a* of a pair of outer frame members 50, and a mold resin 55 is introduced into a gap 53 between the electrode portion 1 and each outer frame member 50, to obtain a basic structure. After the mold resin 55 has been hardened, that tip portion of the basic structure which is indicated by a broken line in FIG. 5C, is removed and the tip of the remaining portion of the basic structure is polished, to expose the electrode portion 1 and the resin 55 to the top surface of the recording head. Thus, as in the fourth embodiment, the straightness of the electrode portion can be surely maintained at the top portion of the electrostatic recording head which is in slidable contact with recording paper when used for recording.

Further, as shown in FIG. 5C, not only the recording electrodes at the top portion of the recording head are protected by the resin 55 introduced into the gap 52, but also the resin 55 adheres closely to the electrode portion 1 at a large area to protect the recording electrodes against electric corrosion. Other advantages of the present embodiment are the same as those of the first embodiment.

FIGS. 5'A, 5'B and 5'C show a modification of the fifth embodiment. As shown in FIG. 5'A, the outer frame member 50 has no protruding portion 50*a*. The electrode portion 1 is fixed between a pair of the outer frame members 50, as shown in FIG. 5'B, which are fixed by a suitable jig (not shown) with a spacer (not shown) therebetween. Then, a mold resin 55 is introduced into the gaps 53 each formed between the electrode portion 1 and each outer frame member 50 thereby to obtain a basic structure of the recording head. After the mold resin has been hardened, the top of the basic structure is polished to provide a smooth surface where the tips of the recording electrodes are exposed as shown in FIG. 5'C. As better seen from FIG. 5'D showing an enlarged view of a part A of FIG. 5'B, the gap 53 has a width almost equal but not less than the thickness of the electrode 52 of the electrode portion 1 and the mold resin may include filler particles as mentioned hereinafter.

Figure 6:
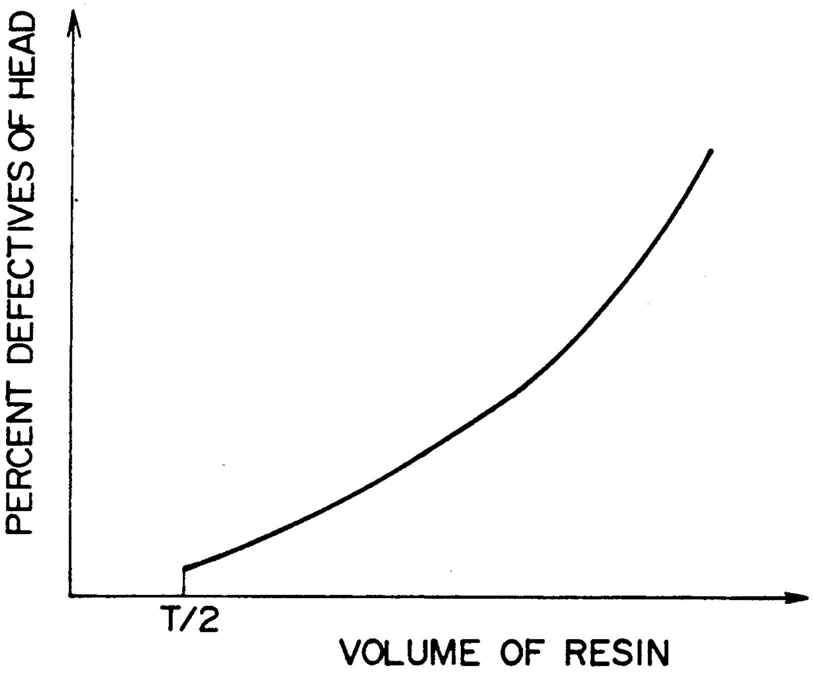
FIG. 6, is a graph showing the relation between the volume of the mold resin introduced into an electrostatic recording head in the first to fifth embodiments and the percent of defectives of recording heads.

FIG. 6 is a graph, obtained by experimental study, showing a relation between the volume of the mold resin introduced into the gap between the electrode portion and the outer frame member and the percentage of defectives due to the warp of an electrode portion or the separation of the resin from the electrode portion, derived from the shrinkage of the resin. The mold resin is introduced to fill up the gap between the electrode portion and the outer frame member. In order to make smaller a separation formed by the shrinkage of the resin at hardening thereof, it is desired to make the amount of the introduced resin as small as possible. In fact, it is impossible to make the distance between an electrode substrate and the outer frame member less than an electrode thickness of about 5 μm. Accordingly, in order to fill the gap between the electrode portion and the outer frame member sufficiently with the mold resin, it is necessary to make the distance between the electrode substrate and the outer frame member greater than the electrode thickness by only a small amount. That is, the thickness of the resin layer thus obtained is made slightly greater than the electrode thickness. As can be seen from FIG. 6, in a region exceeding a resin volume T/2 which is slightly greater than a half of the volume T of a layer of the mold resin having a thickness corresponding to the electrode thickness, the percent defectives of heads increases rapidly with increasing of the volume of the introduced resin. The volume of the mold resin used in the conventional electrostatic recording head corresponds to a right end portion of the curve of FIG. 6. Accordingly, the percentage of defectives of heads is large. Although the first to fifth embodiments are slightly different in quantity of introduced mold resin from one other, these embodiments are far smaller in quantity of introduced mold resin than the conventional electrostatic recording head. That is, according to the embodiments, the percentage of defectives of heads is greatly reduced.

In the above embodiments, thin film electrodes are used as the recording electrodes. Alternatively, wire electrodes may be used as the recording electrodes. Further, in the above embodiments, recording electrodes are formed on one surface of each of two electrode substrates, and then two substrates are bonded to each other to obtain an electrode portion. Alternatively, recording electrodes may be formed on both surfaces of a single electrode substrate to obtain the electrode portion.

According to the above-mentioned embodiments, after an electrode portion has been fixedly sandwiched between a pair of outer frame members, the mold resin is introduced into a gap between the electrode portion and each outer frame member. Moreover, the quantity of introduced mold resin is made far smaller than the quantity of mold resin used for fabricating the conventional electrostatic recording head. Accordingly, the warp of the electrode portion and the generation of cracks in the resin derived from the shrinkage of the introduced resin can be prevented, and thus the manufacturing yield of recording head is increased.

Figure 7:
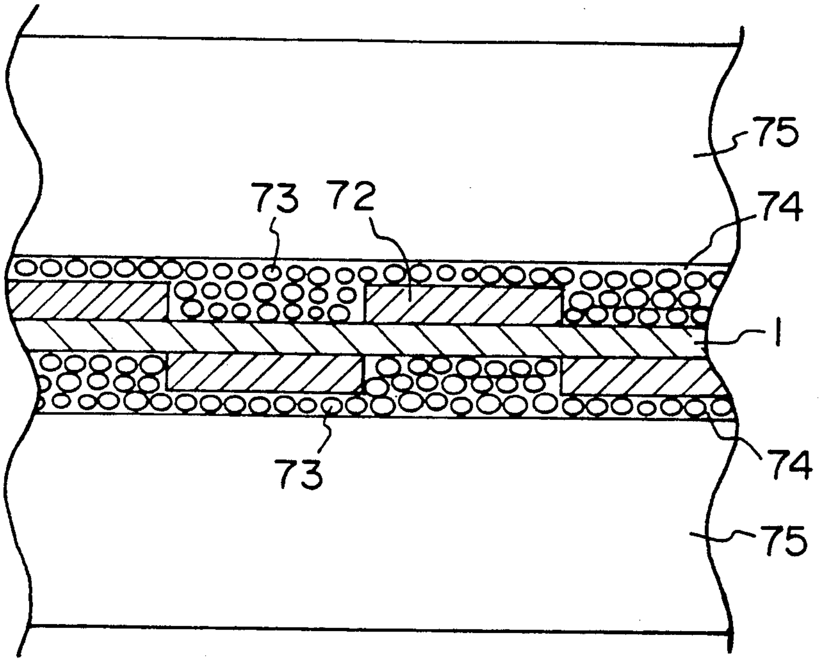
FIG. 7 is a fragmentary enlarged view showing a sixth embodiment of an electrostatic recording head according to the present invention.
Figure 8A:
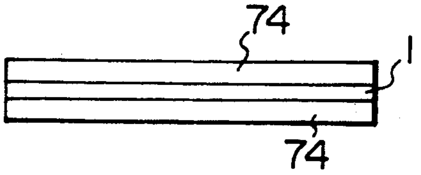
FIGS. 8A, 8B and 8C are diagrams explaining some steps of a method of fabricating the sixth embodiment of FIG. 7.
Figure 8B:
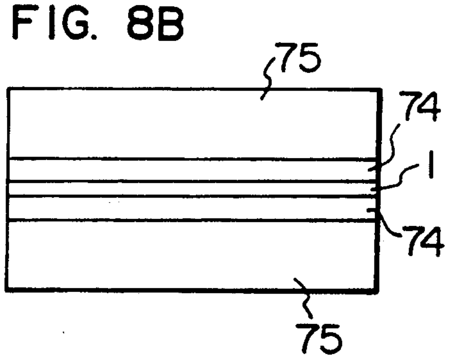
Figure 8C:
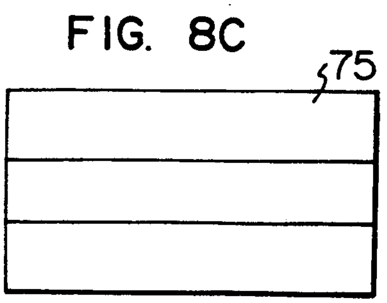
Figure 8C:
Figure 13:
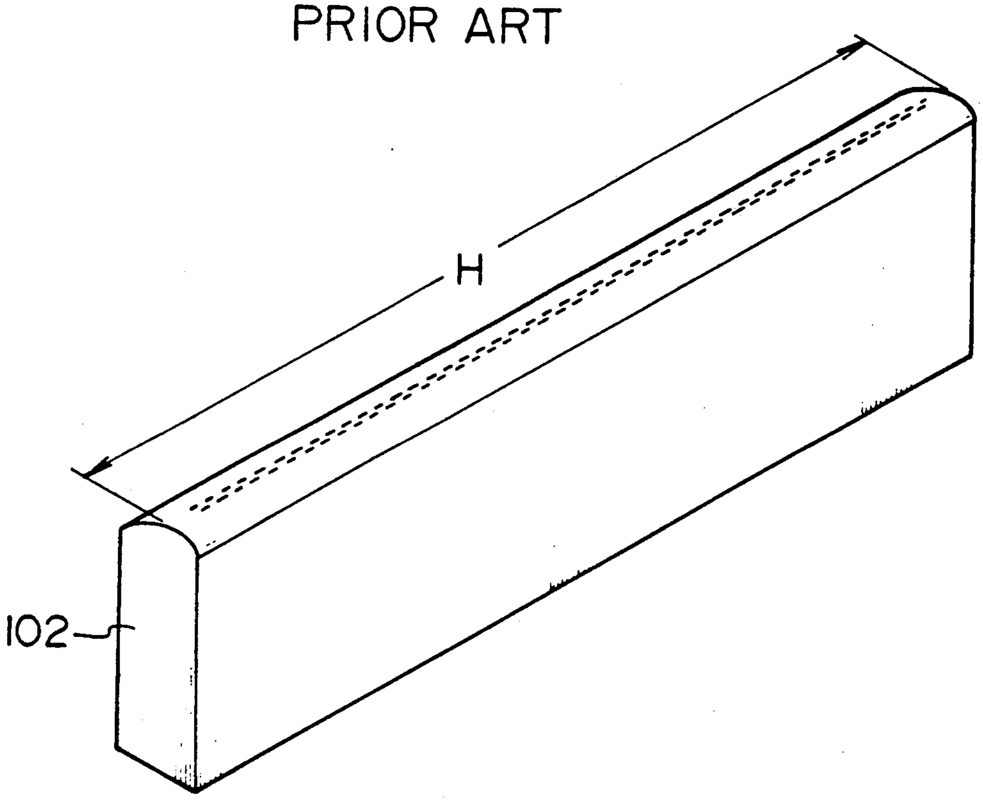
FIG. 13 PRIOR ART
FIGS. 13 to 15 are diagrams explaining the fabrication process of a conventional electrostatic recording.

FIG. 7 is a fragmentary, enlarged sectional view showing a sixth embodiment of an electrostatic recording head according to the present invention, and FIGS. 8A to 8C are diagrams showing a part of the fabrication process of the sixth embodiment. This embodiment includes an electrode substrate 71 which is provided with recording electrodes 72 as in the conventional electrostatic recording head of FIG. 13, an epoxy resin layer 74 formed on both surfaces of the electrode substrate 71 and containing filler particles 73 at a possibly higher density, and a mold resin 75. The filler particles 73 are made of rigid inorganic materials such as $SiO_2$ and $CaCO_3$. Further, filler particle 73 has the form of a sphere having a diameter of 2 to 30 μm, preferably, a diameter less than 5 μm. That is, the filler particle 73 is so small as to allow the particle to enter a gap of 50 to 80 μm width formed between adjacent recording electrodes 72.

When the filler particles are mixed into a resin, it is difficult to obtain a mixture of which a greater part contain, for example, 60% or more filler particles by weight. However, since the resin is greatly degraded only in the vicinity of the surface of the electrode substrate, the resin existing in the vicinity of the electrode substrate is required to contain a large amount of filler particles, but the resin existing in the remaining region is not required to contain any filler particles. Accordingly, in the present embodiment, as shown in FIG. 8A, a thin resin layer 74 having a thickness less than 2 mm and containing filler particles 73 at 1% or more, preferably, 7% or more by weight is first formed on both surfaces of an electrode portion 1. Next, as shown in FIG. 8B, the thin resin layer 74 is covered with the mold resin 75. That is, in this embodiment, the resin mold is formed by two steps. As mentioned above, the diameter of filler particle is required to be as small as possible so that the filler particles are filled in the spaces between adjacent recording electrodes. However, as the diameter of each filler particle is smaller, the viscosity of a mixture containing filler particles is higher so that it is difficult to contain the smaller filler particles at a higher density and hence the density of filler particles is practically 7% or slightly higher than 7% by weight.

In contrast to the above, the present embodiment may be formed in such a manner that the mold resin 75 serving as an outer frame member is first produced as shown in FIG. 8C, the electrode portion 1 is inserted into the mold resin 75, and a resin containing filler particles 73 at a possibly high density is introduced between the electrode portion 1 and the mold resin 75.

Figure 9:
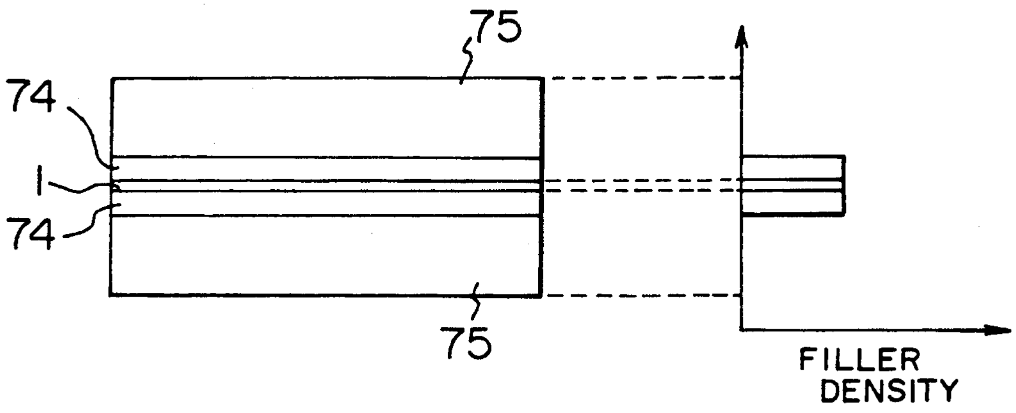
FIG. 9 is a diagram showing the density distribution of filler particles at a tip portion of the sixth embodiment of FIG. 7.

FIG. 9 shows the density distribution of filler particles within a transverse cross section of the present embodiment. As shown in FIG. 9, the filler particles exist only in the vicinity of both surfaces of the electrode portion 1.

As mentioned above, in the present embodiment, the resin layer 74 containing the filler particles 73 at a high density is formed on the electrode portion. Accordingly, the short circuit between adjacent recording electrodes 72 due to electrochemical migration can be prevented. Further, in the present embodiment, the recording head is formed in such a manner that after the resin layer containing filler particles has been hardened, a mold resin is introduced and hardened, so that the peripheral portion of the electrode portion which has a great influence on the dimensional accuracy of the recording head, is formed of a thin resin layer. Accordingly, the above dimensional accuracy is scarcely affected by the shrinkage of the resin layer. That is, the dimensional accuracy of the electrode portion 1 increases, as compared with the conventional fabrication method in which the whole mold resin is hardened in one step. Further, when a plurality of bumps are formed on the resin layer 74, or a plurality of recesses having a depth of 1 to 5 mm are formed in the surface of the mold resin 75 which confronts the resin layer 74, a mold resin other than the resin layer 74 or mold resin 75 will cover the bumps or enter the recesses. Thus, the shrinkage of the above resin will be mechanically suppressed.

Figure 10:
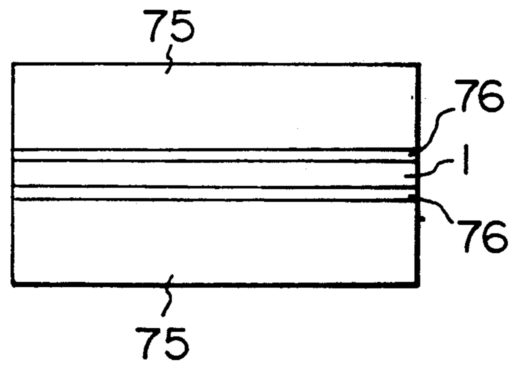
FIG. 10 is a diagram explaining a method of fabricating a modified version of the sixth embodiment of FIG. 7.

FIG. 10 is a diagram showing a part of the fabrication process of a modified version of the sixth embodiment. In FIG. 10, reference numeral 1 designates an electrode portion including an electrode substrate and recording electrodes formed on both surfaces thereof.

In a vessel, a large number of filler particles are mixed into a volatile solvent such as acetone and ethanol. The filler particles are made of, for example, $SiO_2$ or $CaCO_3$.

When the electrode portion 1 is immersed in the mixture, the filler particles attach to the electrode portion 1 by the adhering action of the solvent to the electrode portion. Then, the electrode portion 1 is taken out of the mixture, and only the solvent adhering to the electrode portion 1 is evaporated. Thus, only the filler particles are left on the surface of the electrode portion 1. The diameter of the filler particle is so small that the filler particles can enter a space between adjacent recording electrodes.

When the electrode portion 1 thus treated is disposed in a mold, and a mold resin 75 is introduced into the mold and then hardened, the electrostatic recording head of FIG. 10 is obtained in which a filler particle layer 76 is sandwiched between the electrode portion 1 and the mold resin 75.

In the above, the filler particles are mixed in the solvent. Alternatively, the filler particles may be mixed in liquid epoxy resin. The liquid epoxy resin is nonvolatile. Accordingly, when the electrode portion 1 is taken out of the mixture, the liquid epoxy resin is left on the surface of the electrode portion together with the filler particles. In this case, however, the liquid epoxy resin left on the electrode portion 1 serves as an adhesive agent between the electrode portion 1 and the mold resin 75.

When the filler particle layer 76 is interposed between the electrode portion 1 and the mold resin 75, the density of the filler particles at the surface of the electrode portion 1 can be enhanced. Thus, even when a high voltage is applied to the recording electrodes for a long time, the mold resin 75 is not degraded, and it is possible to prevent a phenomenon that copper ions move between adjacent recording electrodes (made of copper) by electrochemical migration and a short circuit is formed between adjacent recording electrodes. Further, adjacent recording electrodes are insulated from each other by the filler particles 73. Accordingly, the mold resin 75 can be made of a relatively inexpensive material such as low-grade epoxy resin or polyester.

Figure 11A:
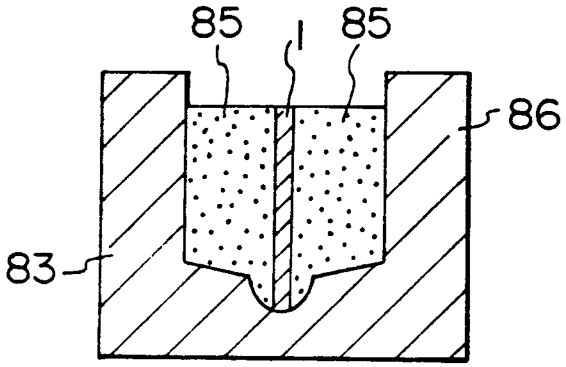
FIGS. 11A and 11B are diagrams explaining a method of fabricating a seventh embodiment of an electrostatic recording head according to the present invention.
Figure 11B:
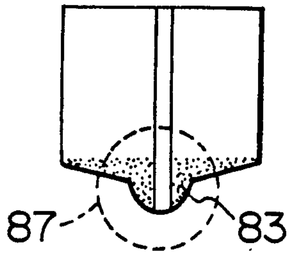

FIGS. 11A and 11B are diagrams for explaining a method of fabricating a seventh embodiment of an electrostatic recording head according to the present invention. In this embodiment, the recording head is formed in such a manner that, by utilizing the specific gravity of a filler particle 83 greater than that of the mold resin 85, filler particles 83 mixed in the mold resin 85 are deposited in a tip portion of the recording head (that is, a bottom portion of FIG. 11A) before the mold resin 85 is hardened. In more detail, as shown in FIG. 11A, an electrode portion 1 is disposed in a mold 86 so that the tip of the electrode portion 1 which is in sliding contact with recording paper during recording operation is located in a bottom portion of the mold 86. Then, the mold resin 85 containing filler particles 85 is introduced into the mold 86, and heat treatment is carried out to harden the mold resin. For example, the heat treatment is carried out at 60° C. for four hours, or at a temperature of 80° to 100° C. for two hours, to deposite filler particles in a lower portion of the resin 85. Further, as shown in FIG. 11A, a recess is formed at the bottom of the mold 86, and the tip of the electrode portion 1 which is in sliding contact with recording paper during recording operation, is inserted into the recess. Thus, the filler particles are efficiently deposited in the vicinity of the tip of the electrode portion 1.

After the mold resin 85 has been hardened, the mold resin 85 is taken out of the mold 86. Thus, the electrostatic recording head shown in FIG. 11B is obtained in which the filler particles 83 are distributed with high density at a tip portion 87 (that is, the most important part) of the recording head.

Figure 12:
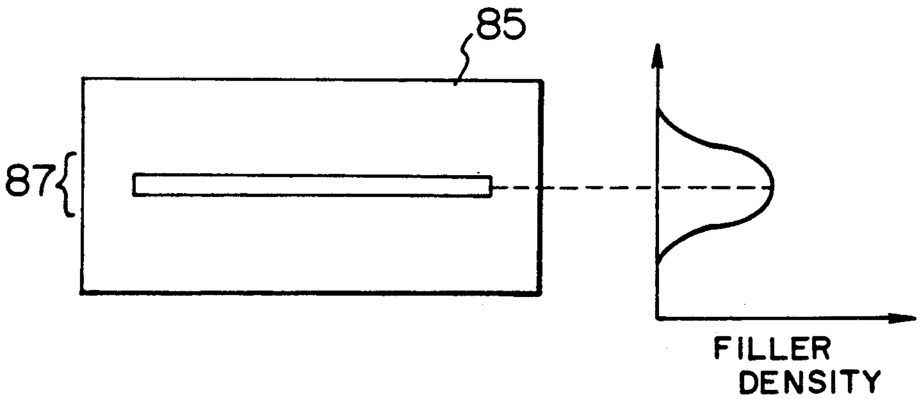
FIG. 12 is a diagram showing the density distribution of filler particles at a tip portion of the seventh embodiment.

FIG. 12 is a graph showing the density distribution of filler particles within a transverse cross section of the recording head of the seventh embodiment. As shown in FIG. 12, the density distribution of the filler particles 83 is high in a central region where the electrode portion 1 exists.

As mentioned above, according to this embodiment, the density distribution of the filler particles 83 is made high in the vicinity of the tip of the electrode portion 1 which is in sliding contact with recording paper during recording operation. Thus, the degradation of the mold resin 85 is lessened, and the trouble of a short circuit between adjacent recording electrodes due to electrochemical migration can be prevented.

In the sixth and seventh embodiments, the resin layer containing filler particles at a possibly high density is formed. Thus, the trouble of a short circuit between adjacent recording electrodes due to electrochemical migration is effectively prevented, and the electric-corrosion resistance of the electrostatic recording head is improved. Further, when the resin layer containing filler particles is first formed, it is possible to harden the resin stepwise. Thus, the shrinkage of the resin due to the hardening thereof can be made very small, and the dimensional accuracy of the recording head is improved.

Further, according to the sixth embodiment, filler particles are applied to the surface of the electrode substrate. Thus, even when a high voltage is applied to the recording electrodes for a long time, the degradation of a resin is lessened by the filler particles existing between adjacent recording electrodes. Accordingly, the trouble of a short circuit between adjacent recording electrodes due to electrochemical migration is effectively prevented, and the electrical-corrosion resistance of the recording head is improved.

Additionally, according to the seventh embodiment, the density distribution of the filler particles is made high in the vicinity of the tip of the electrode portion which is in sliding contact with recording paper during recording operation. Thus, the degradation of the resin existing in the vicinity of the tip of the electrode portion is lessened. Accordingly, the trouble of a short circuit between adjacent recording electrodes due to electrochemical migration is effectively prevented, and the electric-corrosion resistance of the recording head is improved.

What is claimed is:

1. An electrostatic recording head comprising:

an electrode substrate made of an insulating material having two side surfaces;

a plurality of parallel recording electrodes made of a conductive material and formed on at least one of the side surfaces of the electrode substrate so that tip portions of the recording electrodes are in alignment;

a rigid outer member made of an insulating material for covering both side surfaces of the electrode substrate so as to fix the electrode substrate; and an insulating resin layer filled into a space formed at least at a part of the tip portions of the recording electrodes between each of the side surfaces of the electrode substrate and the outer member, said insulating resin layer also filling gaps between every adjacent pair of the recording electrodes whereby substantially preventing electromigration.

2. An electrostatic recording head according to claim 1, wherein the space includes a groove formed in the rigid outer member and extending so as to traverse the tip portions of the recording electrodes.

3. An electrostatic recording head according to claim 1, wherein the space includes a plurality of grooves formed in the rigid outer member and extending in parallel to the recording electrodes.

4. An electrostatic recording head according to claim 1, wherein the space includes a groove formed in the rigid outer member and extending so as to traverse the tip portions of the recording electrodes, and a plurality of grooves formed in the rigid outer member and extending in parallel to the recording electrodes.

5. An electrostatic recording head according to claim 1, wherein the space includes a first groove formed in the rigid outer member and extending so as to traverse the tip portions of the recording electrodes, and at least one other groove formed in the rigid outer member so that the other groove is parallel to and spaced apart from the first groove.

6. An electrostatic recording head according to claim 1, wherein the thickness of the insulating resin layer is slightly greater than the thickness of each recording electrode.

7. An electrostatic recording head comprising:

an electrode substrate made of an insulating material having two side surfaces;

a plurality of parallel recording electrodes made of a conductive material and formed on at least one of the side surfaces of the electrode substrate such that tip portions of the recording electrodes are in alignment;

an outer member made of a rigid resin for covering both side surfaces of the electrode substrate; and a layer containing a plurality of small rigid particles filled in a space formed at least at a part of the tip portions of the recording electrodes between each of the side surfaces of the electrode substrate and the outer member and including gaps between every adjacent pair of the recording electrodes, the small rigid particles being made of an insulating inorganic material.

8. An electrostatic recording head according to claim 7, wherein the layer containing the small rigid particles is provided between each side surface of the electrode substrate and the outer member in the form of a thin layer.

9. An electrostatic recording head according to claim 7, wherein the layer containing the small rigid particles is formed so that the tip portions of the recording electrodes are enclosed inside the layer.

10. An electrostatic recording head according to claim 7, wherein the small rigid particles are made of any one of $SiO_2$ and $CaCO_3$.

11. An electrostatic recording head according to claim 7, wherein each of the small particles has a diameter in a range of about 1/25 to 30/80 of an interval between the recording electrodes.

12. An electrostatic recording head according to claim 7, wherein each of the small particles has a diameter less than 5 $\mu m$.

* * * * *